(12) United States Patent
Moneypenny et al.

(10) Patent No.: US 12,679,278 B2
(45) Date of Patent: Jul. 14, 2026

(54) CONSOLE ACCESSORY LOAD ASSISTANCE FOR A VEHICLE

(71) Applicant: Ford Global Technologies, LLC, Dearborn, MI (US)

(72) Inventors: Stephen Moneypenny, San Diego, CA (US); Bradford Zercoe, San Jose, CA (US); Amil Vira, Irvine, CA (US); Justin Yang, Boise, ID (US)

(73) Assignee: Ford Global Technologies, LLC, Dearborn, MI (US)

( * ) Notice: Subject to any disclaimer, the term of this patent is extended or adjusted under 35 U.S.C. 154(b) by 235 days.

(21) Appl. No.: 18/776,437

(22) Filed: Jul. 18, 2024

(65) Prior Publication Data

US 2026/0021770 A1     Jan. 22, 2026

(51) Int. Cl.
B60R 7/00 (2006.01)
B60R 7/04 (2006.01)

(52) U.S. Cl.
CPC ..................................... B60R 7/04 (2013.01)

(58) Field of Classification Search
CPC .................................. B60R 7/00; B60R 7/04
USPC ....................................................... 296/24.34
See application file for complete search history.

(56) References Cited

U.S. PATENT DOCUMENTS

| | | | |
|---|---|---|---|
| 10,829,054 B2 | 11/2020 | Vanel et al. | |
| 11,535,176 B2 | 12/2022 | Quesnel et al. | |
| 2003/0234550 A1* | 12/2003 | Brooks | B60N 2/793 296/24.46 |
| 2006/0163350 A1* | 7/2006 | Melton | G06K 17/00 224/411 |
| 2007/0296234 A1 | 12/2007 | Sturt et al. | |
| 2012/0000954 A1 | 1/2012 | Shea et al. | |
| 2022/0219584 A1* | 7/2022 | Ketels | B60N 2/79 |

FOREIGN PATENT DOCUMENTS

DE     102020101921 B3     6/2021

* cited by examiner

*Primary Examiner* — Steven O Douglas
(74) *Attorney, Agent, or Firm* — Vichit Chea; Price Heneveld LLP

(57) ABSTRACT

A vehicle includes a seating assembly, a docking station adjacent to the seating assembly, an accessory configured to selectively engage the docking station to couple the accessory with the vehicle, an identification circuit configured to detect the accessory approaching the vehicle, an adjustment system configured to adjust the seating assembly, and control circuitry in communication with the identification circuit and the adjustment system, the control circuitry configured to control the adjustment system to adjust the seating assembly to provide access to the docking station in response to detection of the accessory approaching the vehicle.

20 Claims, 13 Drawing Sheets

CONSOLE ACCESSORY LOAD ASSISTANCE FOR A VEHICLE

FIELD OF THE DISCLOSURE

The present disclosure generally relates to console accessory load assistance for a vehicle, and, more particularly, to automatic component adjustment to enhance access for loading and unloading accessories from a console of a vehicle.

BACKGROUND OF THE DISCLOSURE

Conventional storage access for vehicles can have limited adaptability.

SUMMARY OF THE DISCLOSURE

According to one aspect of the present disclosure, a vehicle includes a seating assembly, a docking station adjacent to the seating assembly, an accessory configured to selectively engage the docking station to couple the accessory with the vehicle, an identification circuit configured to detect the accessory approaching the vehicle, an adjustment system configured to adjust the seating assembly, and control circuitry in communication with the identification circuit and the adjustment system, the control circuitry configured to control the adjustment system to adjust the seating assembly to provide access to the docking station in response to detection of the accessory approaching the vehicle.

Embodiments of the first aspect of the invention can include any one or a combination of the following features:

the accessory includes an identifier, and the identification circuit is further configured to determine an identity of the accessory based on the identifier and control the adjustment system to control an amount of movement of the seating assembly based on the identity of the accessory;

a sensor configured to detect an obstruction for the docking station, wherein the control circuitry is configured to limit the adjustment system from moving the seating assembly in response to detection of the obstruction;

interior lighting of the vehicle, wherein the control circuitry is configured to communicate an instruction to adjust the interior lighting to illuminate the docking station in response detecting no obstruction of the docking station;

the control circuitry is configured to control the interior lighting to reduce illumination of the docking station in response to positioning of the accessory in the docking station;

the control circuitry is further configured to determine a spatial property of the accessory based on the identifier, wherein the docking station is configured to secure different accessories having a plurality of sizes, compare the spatial property to the obstruction, and control the adjustment system further in response to the comparison of the spatial property to the obstruction;

the adjustment system includes a first adjuster configured to adjust the seating assembly in a vehicle forward-rearward orientation, and a second adjuster configured to pivot a seatback of the seating assembly relative to a seat base of the seating assembly, wherein the control circuitry is configured to control the first adjuster and the second adjuster in response to presence of the accessory;

a sensor that is configured to detect a stowed position of the accessory in the docking station, wherein the control circuitry is configured to control the adjustment system to adjust the seating assembly from an adjusted position to a target position different than the adjusted position in response to detection of the stowed position;

a sensor configured to detect occupancy of the vehicle, wherein the control circuitry is configured to limit the adjustment system from moving the seating assembly in response to an occupant positioned vehicle-rearward of the seating assembly; and a user interface configured to present a prompt to control the seating assembly in response to detection of the accessory approaching the vehicle, wherein the control circuitry is configured to control the adjustment system further in response to a user response to the prompt.

According to another aspect of the present disclosure, a method includes detecting, via an identification circuit, an accessory approaching a vehicle, the accessory being configured to selectively engage a docking station to couple the accessory with the vehicle, adjusting, via an adjustment system, a seating assembly of the vehicle in response to detection of the accessory approaching the vehicle to provide access to the docking station.

the accessory includes an identifier, and further includes, determining an identity of the accessory based on the identifier, and controlling an amount of movement of the seating assembly based on the identity of the accessory;

detecting, via a sensor, an obstruction for the docking station, and limiting moving of the seating assembly in response to detection of the obstruction;

communicating an instruction to adjust an interior lighting of the vehicle to illuminate the docking station in response detecting no obstruction of the docking station;

controlling, via control circuitry, the interior lighting to reduce illumination of the docking station in response to positioning of the accessory in the docking station;

determining a spatial property of the accessory based on the identifier, wherein the docking station is configured to secure different accessories having a plurality of sizes, comparing the spatial property to the obstruction, and controlling the adjustment system further in response to the comparison of the spatial property to the obstruction;

detecting a stowed position of the accessory in the docking station, and controlling the adjustment system to adjust the seating assembly from an adjusted position to a target position different than the adjusted position in response to detection of the stowed position;

limiting the adjustment system from moving the seating assembly in response to an occupant positioned vehicle-rearward of the seating assembly; and presenting, via a user interface, a prompt to control the seating assembly in response to detection of the accessory approaching the vehicle, and controlling the adjustment system further in response to a user response to the prompt.

According to another aspect of the present disclosure, a vehicle includes a seating assembly, a docking station adjacent to the seating assembly, an accessory configured to selectively engage the docking station to couple the accessory with the vehicle, an identification circuit configured to detect the accessory approaching the vehicle via an identifier of the accessory, an adjustment system configured to adjust the seating assembly. Control Circuitry in communication with the identification circuit and the adjustment system, the control circuitry is configured to determine a spatial property of the accessory based on the identifier, wherein the docking station is configured to secure different accessories having a plurality of sizes, compare the spatial property to the obstruction, and control the adjustment system to adjust the seating assembly to provide access to the docking station in response to detection of the accessory approaching the vehicle and the comparison of the spatial property to the obstruction.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
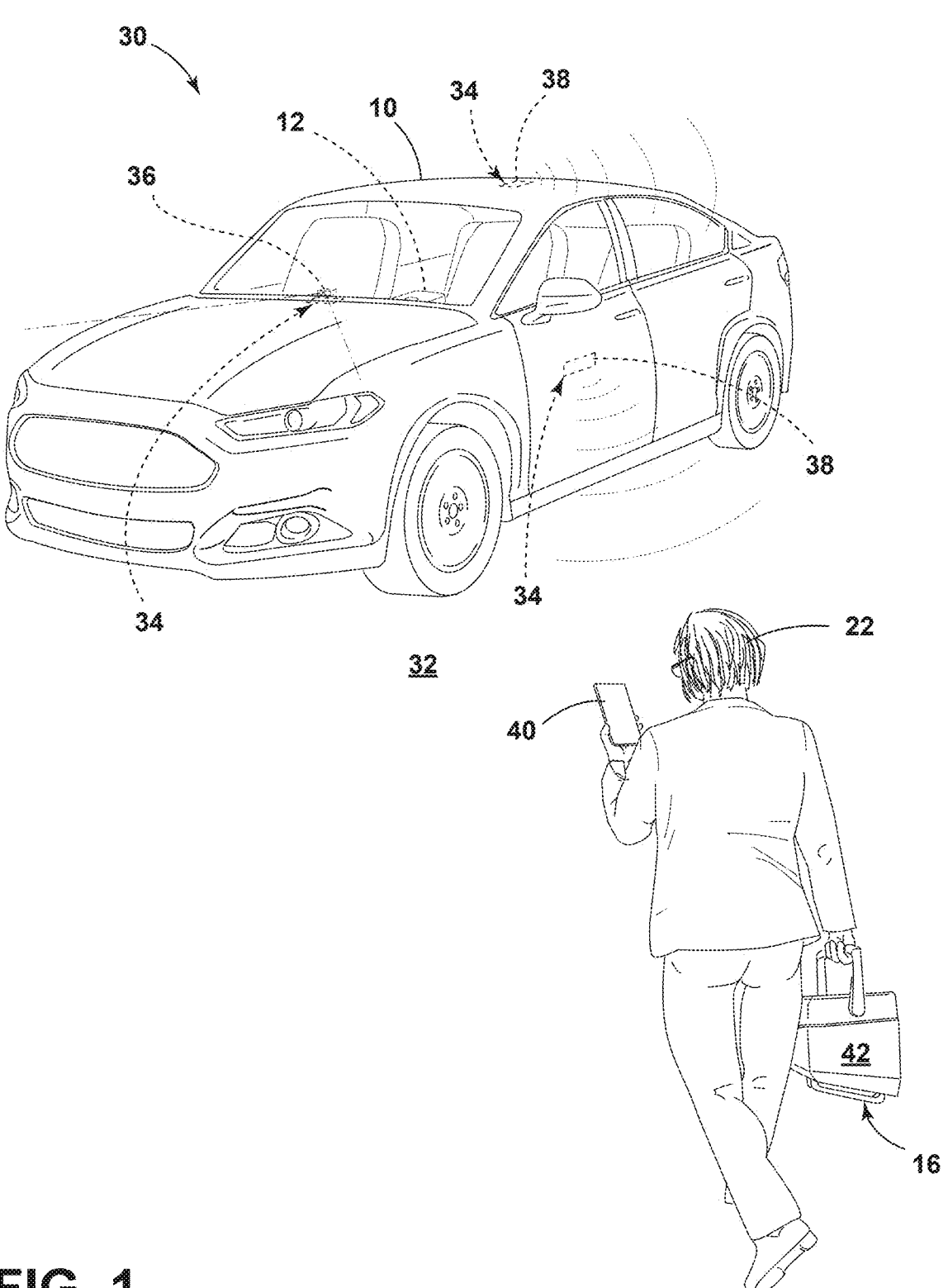
FIG. 1 is a perspective view of a user approaching a vehicle holding an accessory configured to interact with a center console of the vehicle.

For purposes of description herein, the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction or the like does not mean that the feature or component follows a straight line or axis in such a direction or that it only extends in such direction or on such a plane without other directional components or deviations, unless otherwise specified.

Ordinal modifiers (i.e., "first", "second", etc.) may be used to distinguish between various structures of the disclosed transportation rack in various contexts, but that such ordinals are not necessarily intended to apply to such elements outside of the particular context in which they are used and that, in various aspects different ones of the same class of elements may be identified with the same, context-specific ordinal. In such instances, other particular designations of the elements are used to clarify the overall relationship between such elements. Ordinals are not used to designate a position of the elements, nor do they exclude additional, or intervening, non-ordered elements or signify an importance or rank of the elements within a particular class.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the terms "about," "approximately," or "substantially" are intended to mean that a value of a parameter is close to a stated value or position. However, minor differences may prevent the values or positions from being exactly as stated. Thus, unless otherwise noted, differences of up to ten percent (10%) for a given value are reasonable differences from the ideal goal of exactly as described. In many instances, a significant difference can be when the difference is greater than ten percent (10%), except as where would be generally understood otherwise by a person of ordinary skill in the art based on the context in which such term is used.

Referring generally to FIGS. 1-11, the systems and methods provide for automatic adjustment of components of a vehicle 10 (e.g., seating assemblies 11) to provide access to a center console 12 having an interface 14 that is configured to receive a plurality of different accessories 16. The systems and methods can, for example, control seating, and/or lighting of the vehicle 10 to provide access to an area of the center console 12. Further enhancements can be provided by the reading of sensed signals indicative of clearance of the area of the center console 12 to determine what adjustments can be made by the system.

The present systems and methods can also provide for dynamic docking of various removable devices in a vehicle environment. Further, the present disclosure provides for enhanced operability management of the removable devices and connections thereto. The present disclosure also provides for electrical, mechanical, and/or fluid communication between to the removable device when the removable device is installed. Lastly, the present disclosure provides for software management for controlling interaction between the removable device and the vehicle environment.

With continued reference to FIGS. 1-11, a vehicle 10 includes a center console 12 that includes an interface 14. At least one accessory 16 is configured for installation to the center console 12 via the interface 14 and includes an identifier 18. A detection circuit 20 is configured to detect a user 22 approaching the vehicle 10. An identification circuit 24 is configured to determine the identifier 18 in response to a scanning command. A display 26 indicates instructions for the installation of the at least one accessory 16 in response to an indication signal. The vehicle 10 includes control circuitry 28 in communication with the detection circuit 20, the identification circuit 24, and the display 26. The control circuitry 28 is configured to communicate the scanning command in response to detection of the user 22 approaching the vehicle 10. The control circuitry 28 is also configured to communicate the indication signal based on detection of the identifier 18.

According to one example, a vehicle 10, includes a seating assembly 11, a docking station adjacent to the seating assembly 11, and an accessory 16 configured to selectively engage the docking station to couple the accessory 16 with the vehicle 10. An identification circuit 24 is configured to detect the accessory 16 approaching the vehicle 10. An adjustment system 63 is configured to adjust the seating assembly 11. Control circuitry 28 is in communication with the identification circuit 24 and the adjustment system 63 and is configured to control the adjustment system 63 to adjust the seating assembly 11 to provide access to the docking station in response to detection of the accessory 16 approaching the vehicle 10.

The docking station can include the interface 14 and any other alignment features that can limit the movement of the accessory 16 when the accessory 16 is docked in the center console 12. For example, notches, grooves, cams, or the like can protrude from or into a floor 72 or other attachment to guide or otherwise couple the accessory 16 to the interface 14.

Referring now to FIG. 1, a management system 30 for one or more accessories 16 is demonstrated in a vehicle environment. The vehicle environment includes a vehicle 10 and a region 32 external to the vehicle 10 that may be scanned or otherwise monitored by one or more detectors 34, such as cameras 36, proximity sensors 38, radio frequency antennas, or any other wireless detection device that is configured to detect a user 22 approaching the vehicle 10 in the region 32 external to the vehicle 10. For example, the user 22 may carry or equip an electronic device, such as a mobile device 40 (e.g., a smartphone), a key for the vehicle 10 having wireless communication features (e.g., Bluetooth®, Zigbee®, Z-wave®, etc.), or any other electronic device that may be detected by the detector 34. In this way, the user 22 may be detected as approaching the vehicle 10. In response to detection of the user 22 approaching the vehicle 10, various functions may be carried out automatically, such as unlocking the vehicle 10. In one example that will be described herein, the management system 30 may initiate a wake-up sequence for actively sensing or detecting one or more accessories 16 for installation into the vehicle 10. The mobile device 40 may be communicatively coupled with the vehicle 10 via one or more network(s), which may communicate via one or more wireless connection(s), and/or may connect with the vehicle 10 directly using Near Field Communication (NFC) protocols, Bluetooth® protocols, Wi-Fi, Ultra-Wide Band (UWB), and other possible data connection and sharing techniques.

It is contemplated that, while the accessory 16 shown and described herein is a container 42 (e.g., a portable cooler), the accessory 16 may include any other accessory 16 for interaction with the center console 12 that may be selectively removed from the center console 12. For example, charging devices, coolers, removable warming compartments, audio devices, or any other device that can interact with the center console 12 may be managed by the present management system 30.

Figure 2:
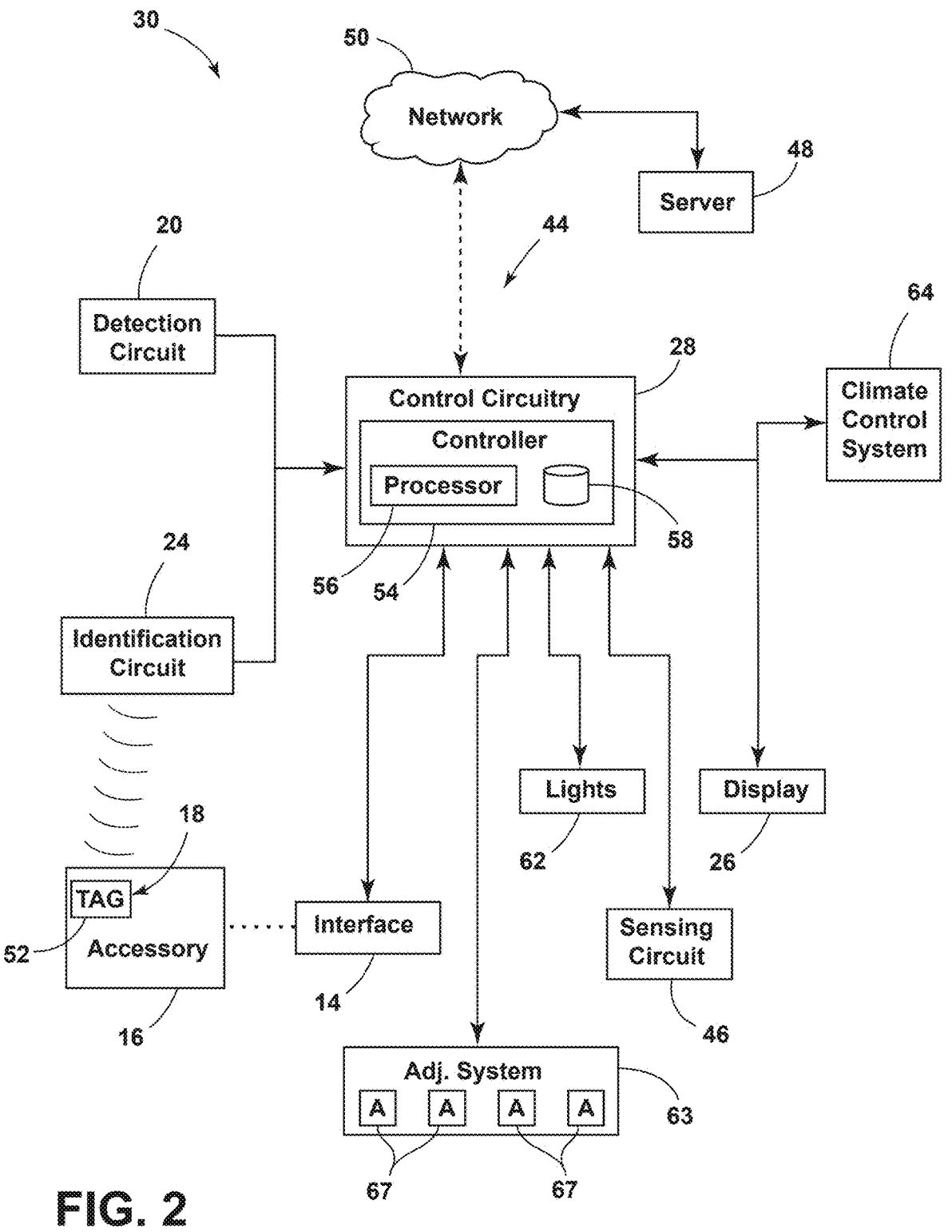
FIG. 2 is a functional block diagram of an accessory management system for a vehicle.

Referring now to FIG. 2, the management system 30 includes an accessory management circuit 44 that includes a detection circuit 20, an identification circuit 24, a sensing circuit 46, and control circuitry 28 local to the vehicle 10 and in communication with a server 48 remote from the vehicle 10. For example, the communication circuitry may be communicatively coupled with a network 50, such as a wireless network 50, that allows for data transfer for updating various portions of the management system 30. By way of example, the server 48 may be configured to push updates to the control circuitry 28 based on software revisions and/or software levels of the control circuitry 28, the detection circuit 20, the identification circuit 24, or any other software-based circuitry of the management system 30. Accordingly, the server 48 may be operable to update detection, identification, or control of the management system 30 to optimally manage interaction with the accessory 16.

As previously described, one or more detectors 34 may be configured to detect the user 22 approaching the vehicle 10. Accordingly, the detection system may include the detectors 34 and circuitry configured to process signals from the detectors 34 to determine a user 22 approaching the vehicle 10. For example, an image processor 56 may be provided for processing images captured by a camera that monitors the region 32 external to the vehicle 10 and classifies objects (e.g., the user 22, the accessory 16).

With continued reference to FIG. 2, the identification circuit 24 includes wireless communication features that are configured to detect and/or identify the accessory 16 in response to activation by the control circuitry 28. The identification circuit 24 can include any wireless communication protocol but, in an exemplary embodiment, includes radio frequency identification (RFID) and is configured to identify the accessory 16 based on unique signal identifiers exchanged between the accessory 16 and the identification circuit 24. For example, an RFID tag 52 or other RFID circuitry may be operably coupled with the accessory 16 to allow the identification circuit 24 to identify a make, model, type, or any other identifiable features of the accessory 16. By way of example, each accessory 16 may be equipped with identifying information such as identifiers 18 indicating available types of connections (electrical, mechanical, fluid). Information regarding the shapes and/or sizes of the accessories 16 may also be encoded in signals between the accessory 16 and the identification circuit 24. Based on the information communicated, the control circuitry 28 can determine compatibility, incompatibility, operability, inoperability, false designation of origin, true designation of origin, or the like. In this way, the management system 30 may automatically detect and control different types of accessories 16.

It is contemplated that other wireless protocols may be employed for identification of the accessory 16, such as Bluetooth®, Bluetooth-low-energy (BLE), ZigBee®, Z-wave®, or any other wireless communication protocol. In some examples, the wireless communication protocol is a low-power feature that is "woken up" when a user 22 is detected approaching the vehicle 10. In response to the wake-up signal, the RFID detection (or other wireless identification method) algorithm may be executed by the identification circuit 24. In this way, power consumption of the management system 30 may be limited and/or optimized.

Still referring to FIG. 2, the control circuitry 28 includes a controller 54 having a processor 56, and a memory 58. The memory 58 is configured to store instructions that, when executed by the processor 56, cause the controller 54 to interact with the detection circuit 20, the identification circuit 24, and other circuitry of the management system 30 to optimally manage the accessory 16 and/or connection between the center console 12 and the accessory 16. For example, as previously described, the center console 12 can include an interface 14 that can mechanically, electrically, and/or fluidly connect with the accessory 16 and serve to dock the accessory 16 to the center console 12. The sensing circuit 46 is provided for detecting alignment of the accessory 16 with the interface 14. The sensing circuit 46 can include a position sensor 60, such as an electrical switch, that electrically actuates (e.g., closes or opens) in response to mechanical interaction and/or alignment of the accessory 16 with the interface 14. For example, the position sensor 60 can detect a stowed position of the accessory 16.

The management system 30 can also include lights 62, the display 26, an adjustment system 63, and a climate control system 64 for the vehicle 10 or local to the center console 12. Accordingly, the climate control system 64 may be a local climate control system 64 or a vehicle-wide climate control system 64 having one or more heating/cooling circuits for heating/cooling the accessory 16 when the accessory 16 is operably coupled with the interface 14. The lights 62, which may include light-emitting diodes or any other lighting device, may be arranged in a target area 66 proximate to the center console 12 for illuminating a target area 66 for installing the accessory 16, as will be described in the foregoing figures. Accordingly, the lights 62 can include interior lighting of the vehicle 10. Accordingly, the control circuitry 28 may process information from the detection circuit 20, the identification circuit 24, and the server 48, and control one or more of the devices, such as the lights 62, the display 26, and/or the climate control circuitry 28. The display 26 can include both inputs and outputs, as will be described further herein.

With continued reference to FIG. 2, the adjustment system 63 can include a plurality of adjusters 67 that are configured to move, rotate, or other position components of the vehicle 10. For example, the adjustment system 63 can include a first adjuster 67 configured to adjust a seating assembly 11 in a vehicle-forward-rearward orientation and a second adjuster 67 configured to pivot a seatback 100 of the seating assembly 11 relative to a seat base 102 of the seating assembly 11. The control circuitry 28 can be configured to control the first adjuster 67 and the second adjuster 67 in response to presence of the accessory 16. For example, the seating assembly 11 can be reversed and reclined, moved forward and inclined forward, or the like, in response to entry location of the accessory 16 or detection of which door of the vehicle 10 is opened.

The adjusters 67 can include electromechanical actuators such as motors, valves, and solenoids, as well as components that correspond to the electromechanical actuators, such as transmission units, bladders, or the like. In an exemplary embodiment, the adjusters 67 are configured to adjust the seating assembly 11. For example, the adjusters 67 can move one or more of the seating assemblies 11 to various positions. As will be described in further detail herein, the adjustment system 63 can control the adjusters 67 to adjust the seating assembly 11 to a position whereby the target area 66 is accessible for installation or uninstallation of the accessory 16, and further to a target seating position/configuration for a user.

The sensing circuit 46 can include any sensing device configured to detect an obstruction of the docking station and/or a target path or movement of the adjustable components. For example, the sensing circuit 46 can include laser sensors, ultrasonic sensors, capacitive sensors, or any other sensor that can detect an object's space in or around the target area 66. In further examples, an occupant monitoring system (OMS) including a camera or other sensor (e.g., LiDAR, RADAR) can be used to detect occupancy of the vehicle 10, such as seating positions of occupants. In general, the sensing circuit 46 can include sensors that detect whether the target area 66 is blocked and/or whether the seating assemblies 11 can move to an adjusted position (via the adjustment system 63) without obstruction and space limitation for the occupant (e.g., seating adjustments influencing legroom). The sensing circuit 46 can also, or alternatively, include door position sensors for detecting an open position and a closed position of doors of the vehicle 10.

Figure 3:
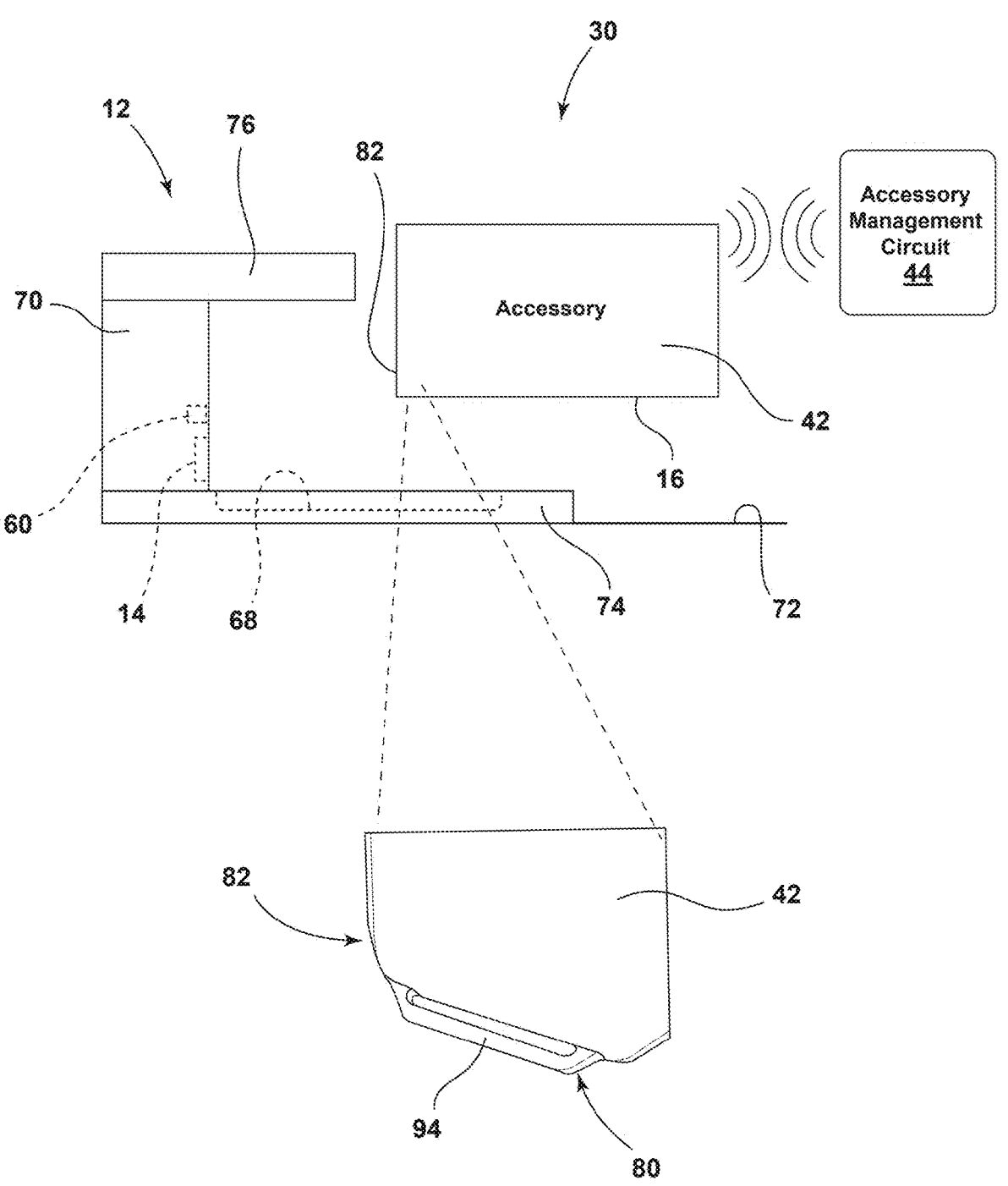
FIG. 3 is a side plan view of a center console configured to receive at least one accessory that includes a striker feature interacting with a portion of the center console.
Figure 4:
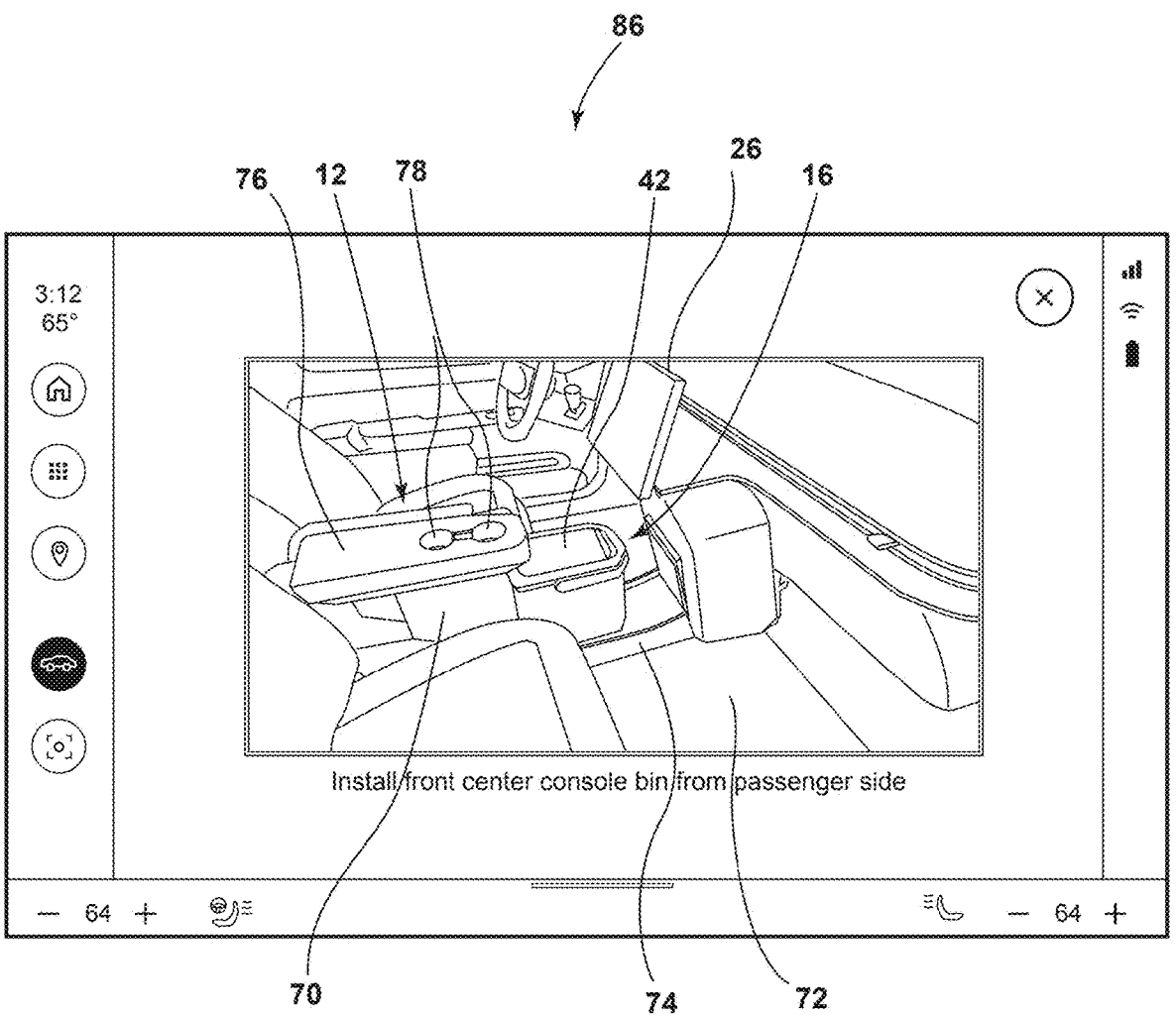
FIG. 4 is an exemplary image of a display configured to guide a user to install at least one accessory into the center console according to one example.
Figure 5:
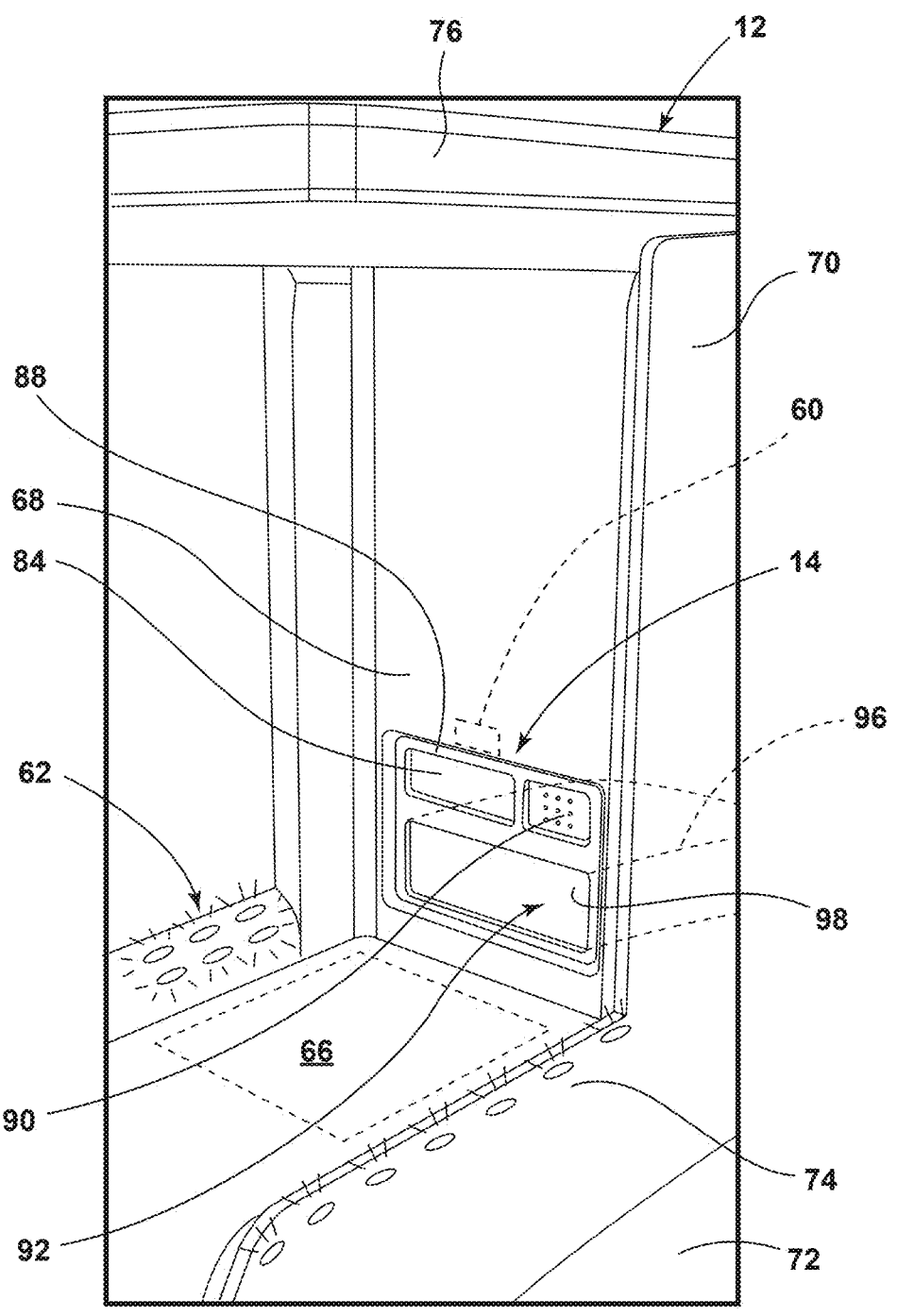
FIG. 5 is a perspective view of a center console configured to receive at least one accessory and includes an interface for interacting with at least one accessory.

Referring now to FIGS. 3-5, the center console 12 is demonstrated defining a receptacle 68 configured to receive the accessory 16. The console includes a central support 70 operably coupled with a floor 72 of the vehicle 10 via a base 74. The central support 70 supports an upper portion 76 of the center console 12 that may support arms of the user 22 (e.g., a driver and/or a passenger), cup holders 78, phone holders, compartments for storage, or the like. In some examples, a charging port may be provided, such as a universal serial bus (USB) report that may provide power and/or data connectivity between the mobile device 40 and the vehicle 10.

The interface 14 of the center console 12 may be disposed adjacent to the receptacle 68 and provide for mechanical, electrical, and/or fluid communication with the accessory 16. For example, the accessory 16 may include a striker 80 feature along a lower portion 82 of the accessory 16 that is configured to interact with a catch 84 to mechanically secure the accessory 16 with the vehicle 10. Other connections may be provided, as will be described with respect to FIG. 5. With continued reference to FIG. 3, the accessory management circuit 44 may be in wireless communication with the accessory 16. For example, the previously described identification circuit 24 may be actively identifying the accessory 16, and the accessory management circuit 44 may present instructions, or indications, for installation of the accessory 16 via the display 26.

Referring now to FIG. 4, an exemplary user interface (UI 86) demonstrates an instruction for the accessory 16 to be installed with the center console 12. Accordingly, various pictographic representations, words, or other communication may be indicated at the UI 86 to indicate to the user 22 how to install the specific accessory 16 identified by the identification circuit 24. For example, while one accessory 16 is demonstrated throughout the figures, various accessories 16 having different shapes, models, manufacturers, or other properties may be configured to interact with the interface 14 and install with the console. Thus, the memory 58 of the control circuitry 28 may store various images and/or instructions demonstrating installation of a plurality of the accessories 16. In this way, a detailed guide of how to install a target accessory 16 identified by the identification circuit 24 may be presented at the display 26.

Referring now to FIG. 5, the target area 66 for the accessory 16 is demonstrated in the receptacle 68 defined by the base 74 of the center console 12 and generally aligned with the interface 14. The lights 62 may surround or otherwise be configured to illuminate the target area 66 in response to a signal from the control circuit. For example, upon detection of a compatible accessory 16, the controller 54 may activate the lights 62 with a flashing sequence to indicate placement of the accessory 16. The interface 14 includes a mechanical interface 88 that locks the accessory 16 with the center console 12, an electrical interface 90 that electrically couples the accessory 16 with the center console 12, and a fluid interface 92 that fluidly couples the accessory 16 with the climate control system 64. This configuration is merely exemplary and non-limiting. For example, in other configurations, only one or some of the mechanical interface 88, the electrical interface 90, and the fluid interface 92 are provided.

The mechanical interface 88 can include the catch 84 that interacts with the striker 80 or other mechanical features of the accessory 16 to secure the accessory 16 to the vehicle 10. For example, a hook or other mechanism can move to a locked position in response to the catch 84 receiving the striker 80. The catch 84 may be electronically controlled via the control circuitry 28, which may activate the catch 84 in response to movement of the catch 84 or other mechanisms of the catch 84. Accordingly, the sensing circuit 46 may be operably coupled with the mechanical interface 88 to detect engagement/alignment of the accessory 16 with the mechanical interface 88. For example, the striker 80 can include a bar 94 that engages the catch 84 and moves one or more parts of the catch 84 to cause a position sensor 60 to electrically close. The control circuitry 28 can detect closing of the position sensor 60 and, in response, communicate a signal to move the hook to secure the bar 94. For example, a solenoid, a valve, a motor, or another electromechanical device can be energized to lock the accessory 16.

The electrical interface 90 may include a power and/or data bus for powering and/or communicating with one or more components of the accessory 16 for example, in addition to the identifier 18 of the accessory 16, a validation circuit may be provided in the accessory 16 that communicates an indication of identity over wired connection following coupling of the electrical interface 90. For example, the electrical interface 90 may include a male part that receives a female part on the accessory 16, or vice versa. Accordingly, the accessory 16 can plug into the electrical interface 90 to exchange data/or power.

In addition, or as an alternative to validation over wired communication, the electrical interface 90 may provide power to one or more cooling or heating elements for cooling/heating the accessory 16. For example, if the accessory 16 is a self-contained cooling device (active cooler), the accessory 16 may cool contents of the accessory 16 using electrical power from the electrical interface 90.

Still referring to FIG. 5, a conduit 96 or other tubing may be provided within the center console 12 for fluid communication with the climate control system 64. For example, the conduit 96 may extend within a body of the center console 12 and into the floor 72 of the vehicle 10 to return to the climate control system 64. The climate control system 64 can include one more baffles and/or heat exchangers for selectively providing heated or cooled air to the accessory 16 when the accessory 16 is connected with the interface 14. For example, the fluid interface 92 can include a door 98 that opens in response to the accessory 16 engaging the interface 14. For example, the door 98 may be a hinged door 98 that is biased toward a closed position that is pushed open by the accessory 16. Accordingly, when the accessory 16 is connected with the interface 14, an internal environment of the accessory 16 may be climate controlled.

In general, interaction between the accessory 16 and the interface 14 may be controlled by the accessory management circuit 44 previously described. For example, incompatible accessories 16 may be detected using the identification circuit 24, and one or more of the features of the interface 14 may be limited from completing connection with the vehicle 10. For example, the control circuitry 28 may limit activation of the catch 84 to lock the accessory 16 with the vehicle 10 in response to detection of an incompatible accessory 16. Further, or alternatively, other connections of the interface 14 may be limited from interfacing with the interface 14. For example, in a spoofing scenario in which the identification circuit 24 detects a valid accessory 16, upon electrical connection at the electrical interface 90 with the accessory 16, the validation circuit may serve as a backup check to confirm compatibility of the accessory 16 with the interface 14. By way of example, an unapproved manufacturer of the accessory 16 may manufacture an accessory 16 with a spoofed identifier 18 while being limited from spoofing the validation circuit which may be detected by the control circuitry 28 upon wired communication at via the electrical interface 90.

As will be described further in reference to FIGS. 6 and 7, in addition to anti-spoofing measures, the control circuitry 28 may further provide for detection of out-of-date software and provide for automatic downloading and/or requesting for downloading of updated software to expand a list or database 74 of compatible devices. For example, the vehicle 10 incorporating the center console 12 and/or interface 14 may be manufactured at a first date, and future upfit accessories 16 may be manufactured at a second date later than the first date. Accordingly, a software update may be required for interfacing with the center console 12. Thus, active tracking and updating of software revisions may be provided by access to the server 48 via the network 50.

Figure 6:
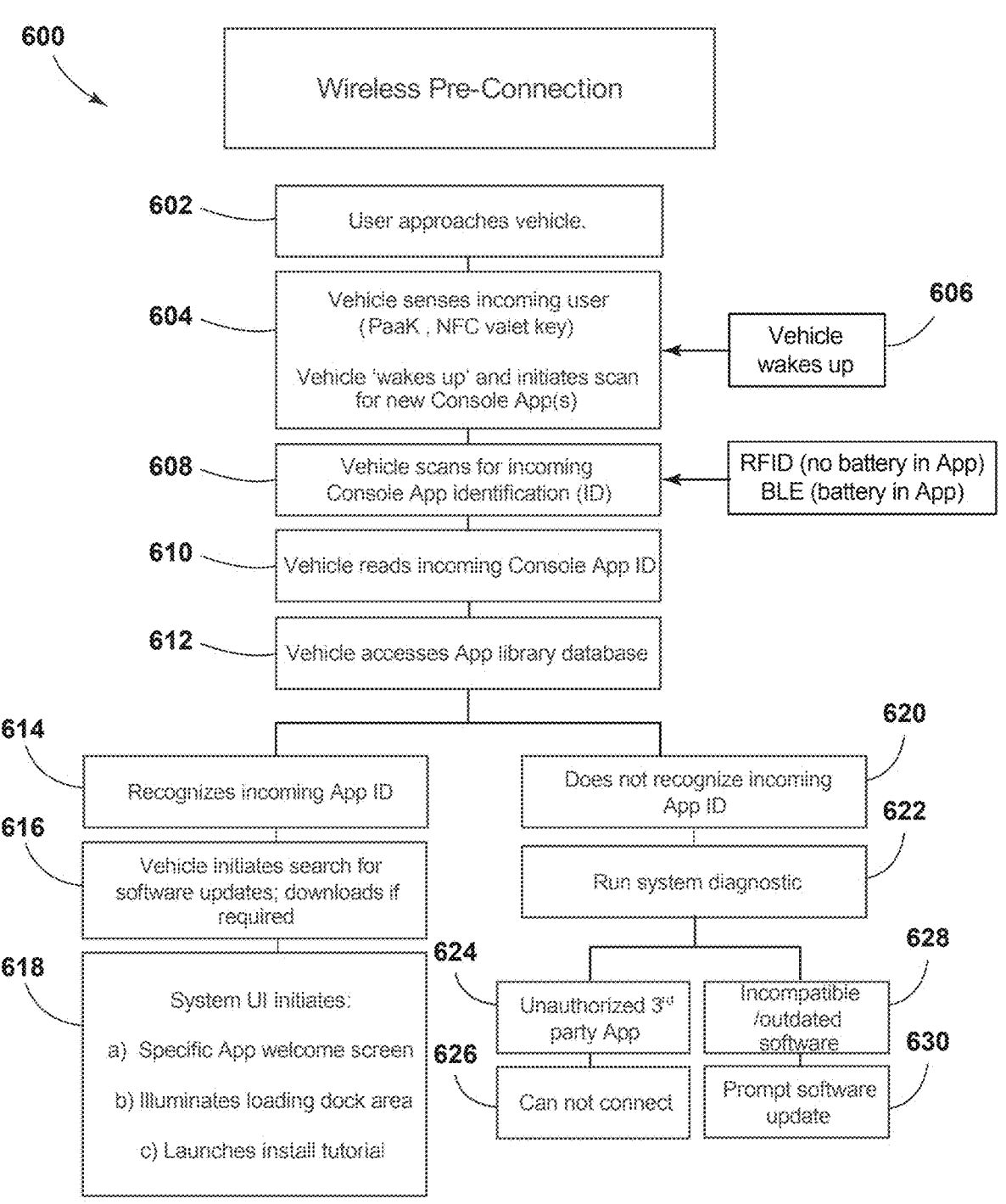
FIG. 6 is a flow diagram of an exemplary process for managing accessory operability with a vehicle.

Referring now to FIG. 6, a first method 600, or process, carried out by the management system 30 includes a pre-connection stage via wireless communication. The first method includes sensing a user 22 approaching the vehicle 10 at step 602. In response, the control circuitry 28 communicates a signal to the identification circuit 24 to wake up or initiate an identification algorithm executed by the identification circuit 24 at step 604, and the identification circuit 24 wakes up at step 606. At step 608, the identification circuit 24 scans for the accessory 16 in order to detect the identifier 18 (e.g., an RFID identifier 18, a response signal via Bluetooth). While BLE and RFID are presented at step 608 as possible communication methods, other communication protocols described herein may be implemented for scanning of the accessory 16. At step 610, the identification circuit 24 reads the identifier 18. At step 612, the control circuitry 28 searches the memory 58 and/or a database 74 at the server 48 to recognize the identifier 18.

If the control circuitry 28 recognizes the identifier 18 and it is classified as a compatible device (step 614), the control circuitry 28 nonetheless communicates, via the network 50, to the remote server 48 to search for software updates for the management system 30 (step 616). Concurrently, or following the communication to the server 48, the control circuitry 28 communicates an instruction to the display 26 to indicate installation of the accessory 16 to the interface 14 based on the particular ID (step 618). For example, the control circuitry 28 can select between a plurality of different screens corresponding to different accessories 16 compatible with the vehicle 10. The screens may include motion arrows and/or a sequence of images demonstrating a time-lapse video indicating steps or instructions for installation of the given accessory 16. The control circuitry 28 may further activate the lights 62 during when the instructions are presented at the UI 86 to guide the user 22 to the area for installing the accessory 16.

It is contemplated that other instructions may be presented at the display 26 relevant to the operation of the given accessory 16. For example, based on the identity of the detected accessory 16, electrical and/or fluid communication with the accessory 16 may be initiated. For example, the climate control system 64 may heat or cool the accessory 16 based on the identity of the accessory 16. Further, other options specific to the accessory 16 identified may be presented at the display 26 for manual control over environmental conditions and/or electrical conditions for interaction with the accessory 16.

If the control circuitry 28 does not recognize the identifier 18 of the accessory 16 (step 620), the control circuitry 28 may run a system diagnostic to classify the incompatibility as due to an unauthorized make or model, or legacy/newer model that is otherwise compatible (step 622). If an unauthorized make or model is detected (step 624), the method includes indicating at the display 26 that the given accessory 16 cannot connect (step 626). Further, the locking of the accessory 16 with the center console 12 may be limited (e.g., the mechanical interface 88 may be limited) from controlling the catch 84 in either an automatic or manual operating mode. Stated differently, in some examples, classification of the incompatible accessory 16 as unauthorized may limit the user 22 from activating the catch 84 manually to override the unauthorized use.

If the control circuitry 28 categorizes the incompatibility as a result of legacy/outdated products or new/upfit products (step 628), the control circuitry 28 may communicate with the server 48 to download software to allow interaction with outdated or updated makes/models that are otherwise authorized. The user 22 can be prompted for the software update at step 630.

Figure 7:
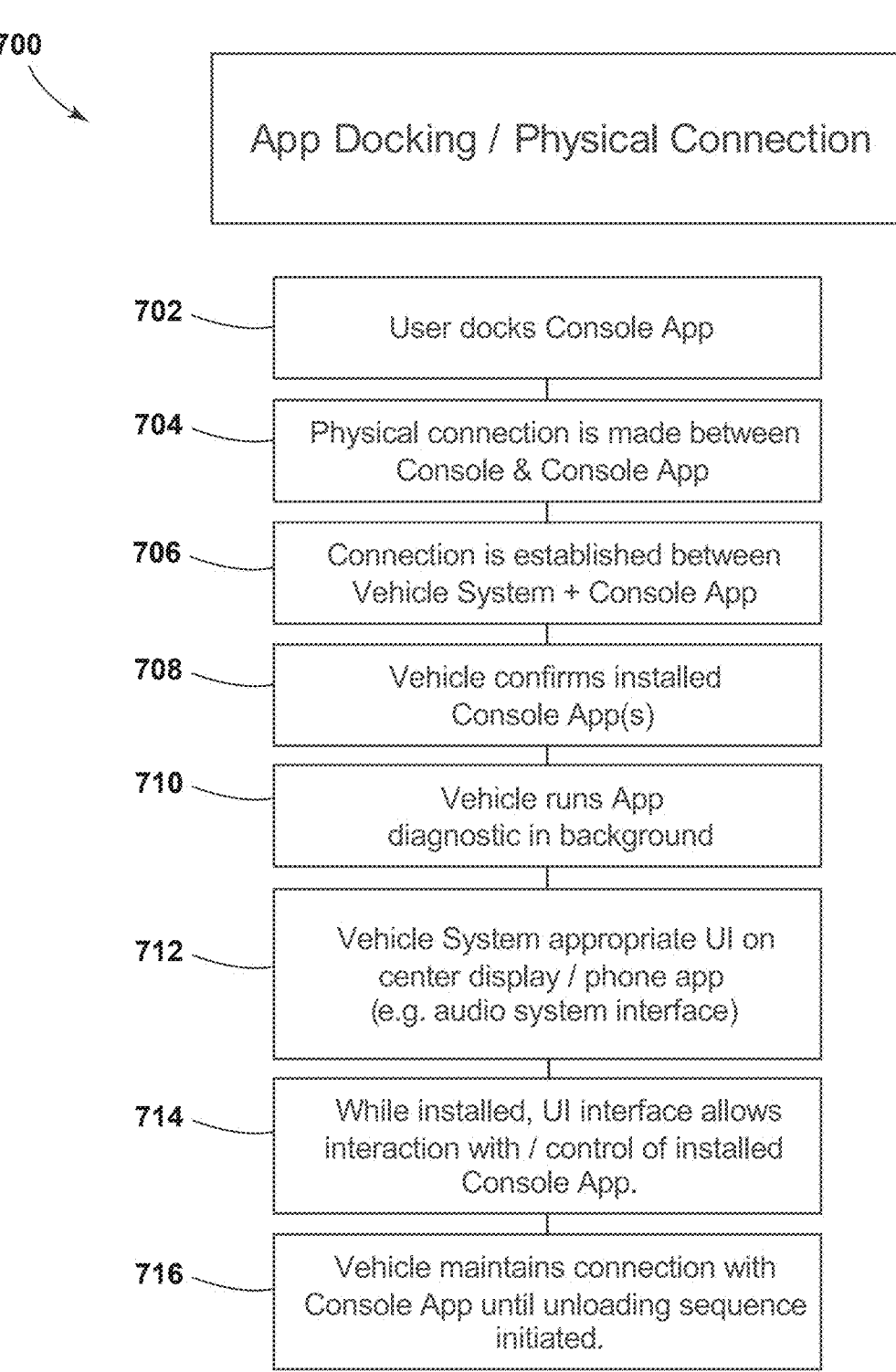
FIG. 7 is a flow diagram of an exemplary process for managing an accessory coupled to the center console of a vehicle.

Referring now to FIG. 7, a second method 700, or process, carried out by the management system 30 includes the physical docking of the accessory 16 with the interface 14 and communication thereafter. At step 702, the user 22 docs the accessory 16. Add step 704, following classification as a compatible device, the control circuitry 28 initiates physical connection with the interface 14 (e.g., the mechanical interface 88). For example, the control circuitry 28 may communicate a signal to the catch 84 to move to a closed position to lock with the striker 80. At step 706, electrical connections with the electrical interface 90 and the accessory 16 are initialized via initialization signals between the control circuitry 28 and the accessory 16. At step 708, the control circuitry 28 searches for updates at the server 48 to provide optimal operational features for the accessory 16. At step 710, various diagnostics and/or checks for proper operation of the accessory 16 are communicated between the control circuitry 28 and the accessory 16 via the electrical interface 90. For example, the validation circuit previously described may be in communication with the control circuitry 28 to validate compatibility and/or optimal operation.

At step 712, the display 26 is updated to indicate the corresponding accessory 16 throughout operation with the accessory 16. For example, the control circuitry 28 may search for and select a plurality of screens for the UI 86 at the display 26 to show pictures and/or video of the given accessory 16 identified by the identification circuitry 24 and/or the wired connection. Stated differently, the memory 58 can include various sets of images and/or videos demonstrating installation and/or operations specific to this particular make/model of the accessory 16 identified. It is contemplated that the user interface may also, or alternatively, include audio instructions for guiding the user 22 for installation and operation of the accessory 16 to the interface 14.

At step 714, while the accessory 16 is installed and connected with the interface 14, the UI 86 provides control by the user 22 over the accessory 16. For example, climate control, such as temperature, humidity, or another climate feature may be controlled at the UI 86. Because the interface 14 may be operable with a plurality of different accessories 16 with some having climate control and others lacking climate control, the set of screens selected by the control circuitry 28 may be specific to the make/model of the accessory 16 identified, and climate control may be limited to those models enabled with climate control. At step 716, visual and/or audio indications may be provided by the user interface to indicate an unloading sequence to disconnect the accessory 16 from the interface 14. For example, upon a key-off scenario (ignition off/power off), the display 26 can update to an indication to remove the accessory 16 and provide instructions to do so.

Figure 8A:
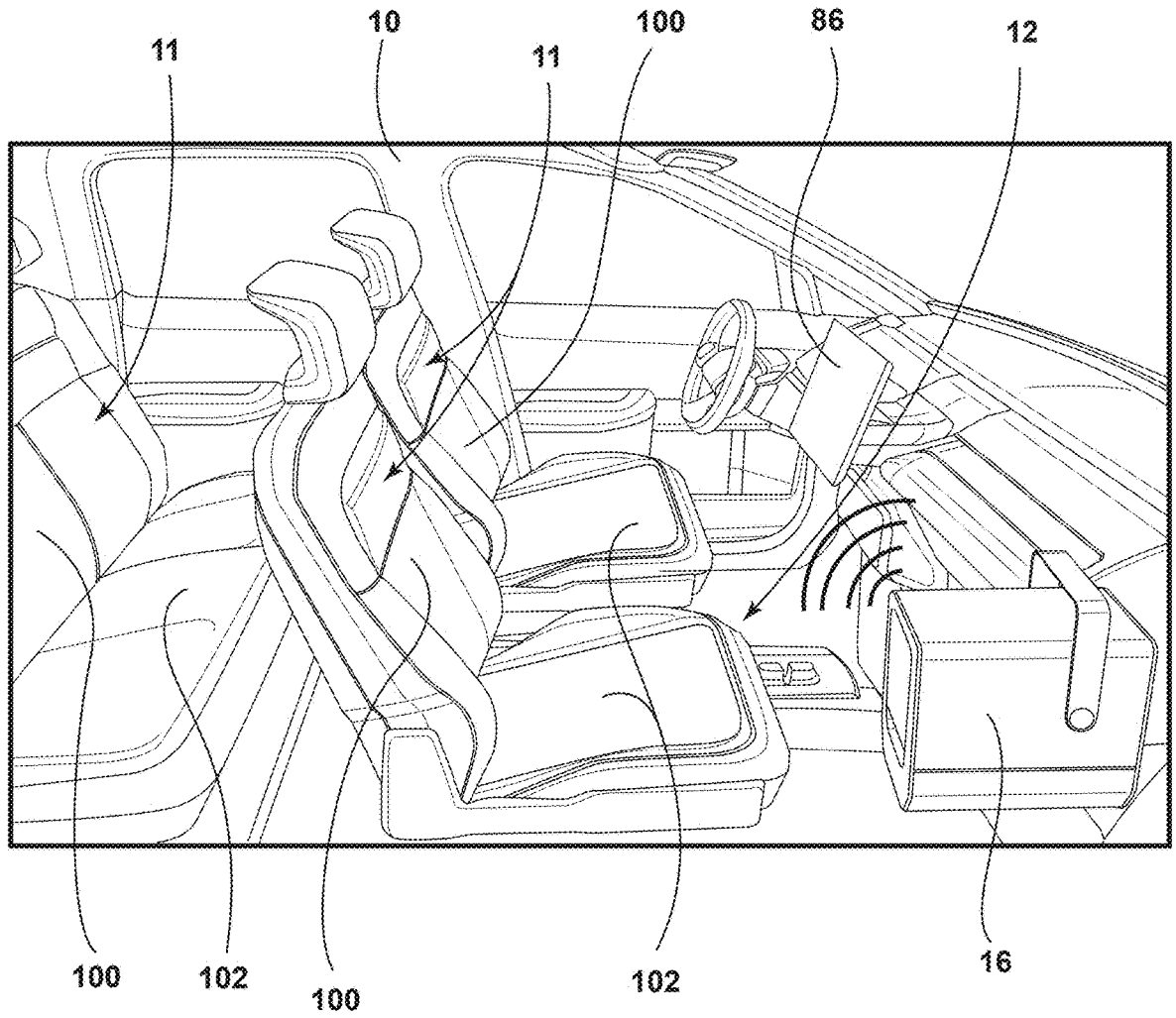
FIG. 8A is a perspective view of seating assemblies of a vehicle incorporating an accessory management system that detects an accessory, with front seating assemblies positioned in an initial position.
Figure 8B:
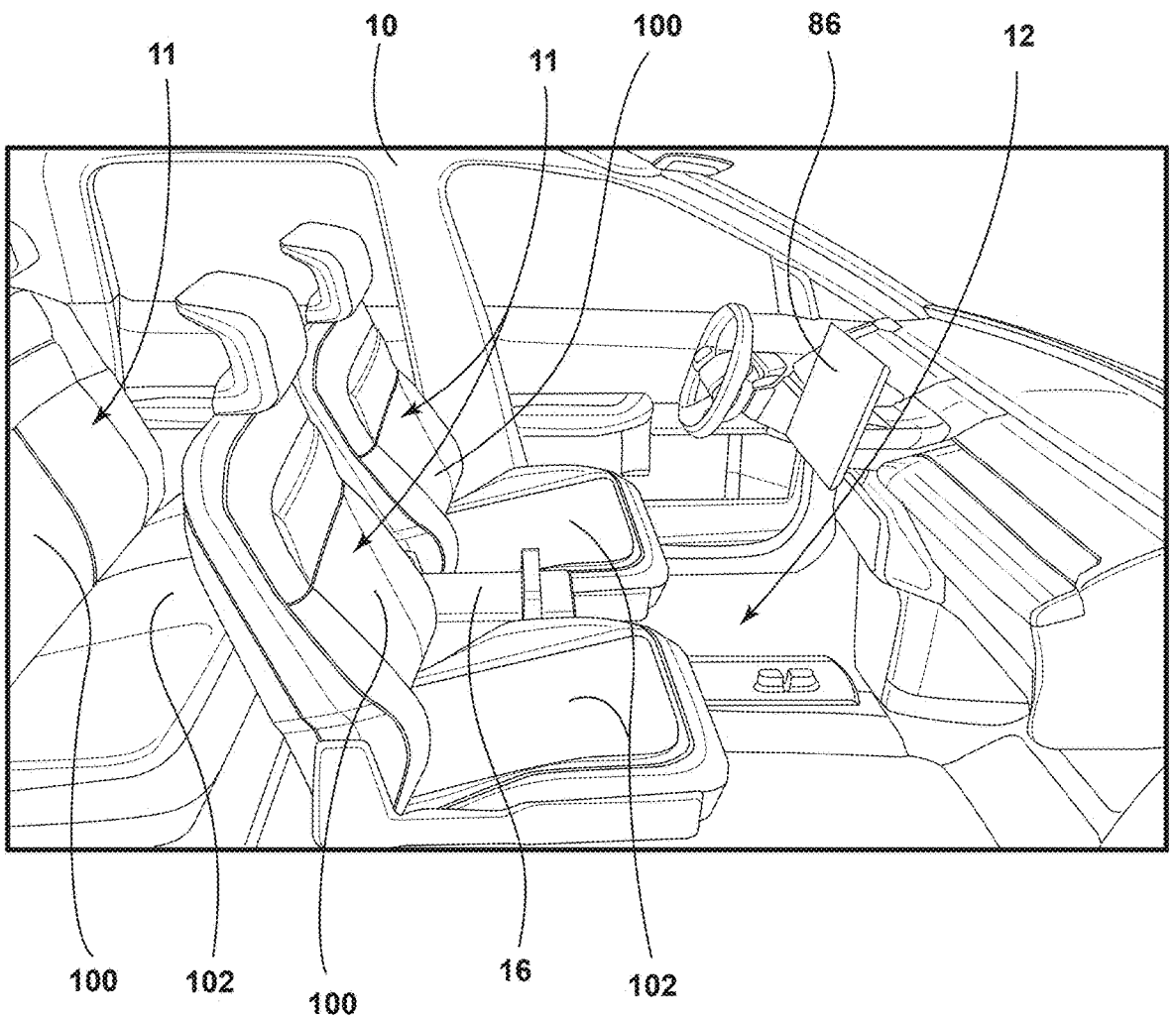
FIG. 8B is a perspective view of the front seating assemblies positioned rearward of the initial position in response to presence of the accessory of FIG. 8A.
Figure 8C:
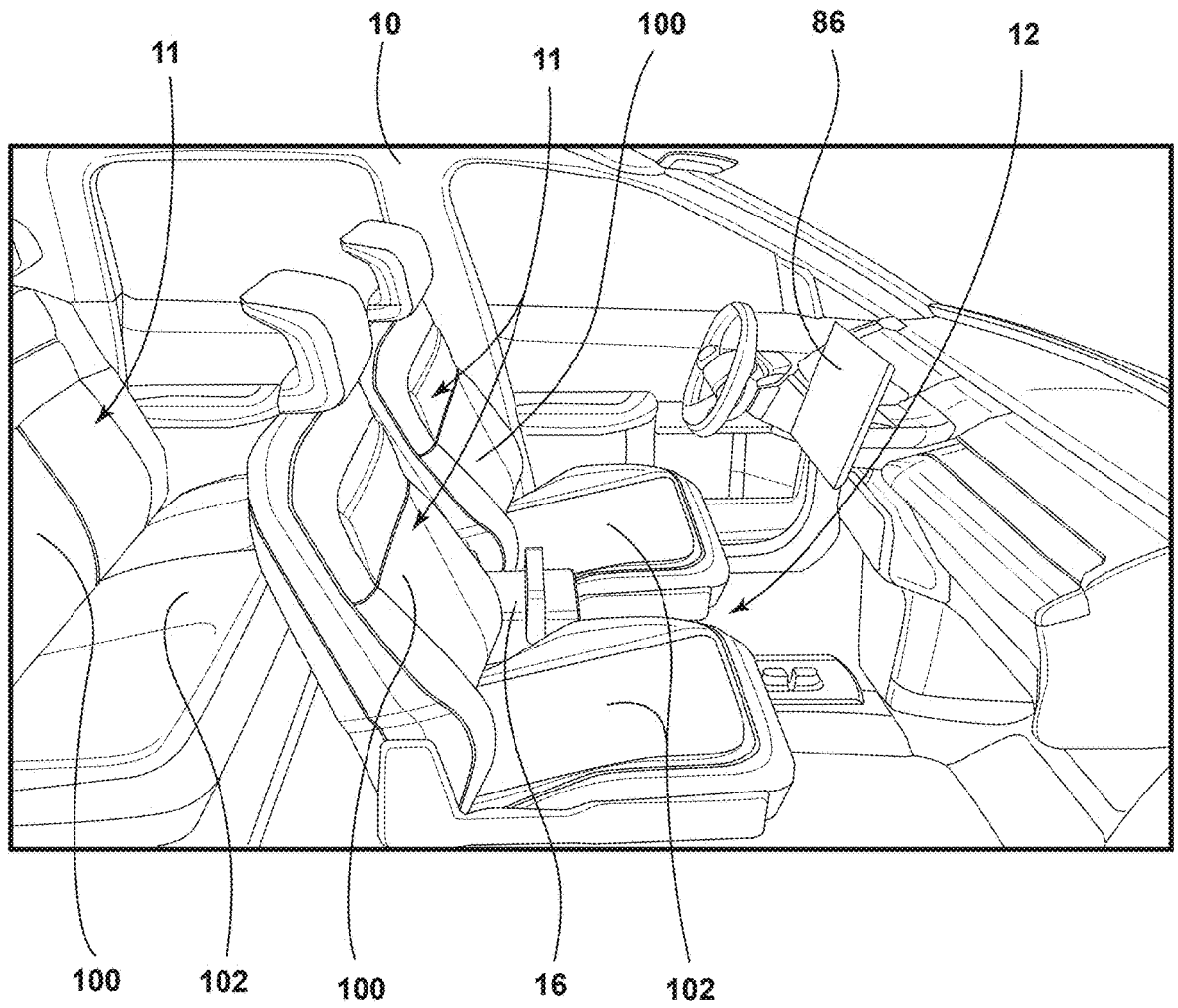
FIG. 8C is a perspective view of the front seating assemblies positioned at a target seating position following installation of the accessory of FIGS. 8A and 8B in a center console of the vehicle.

Referring now to FIGS. 8A-8C, a response by the management system 30 to the detection of the accessory 16 is depicted in reference to a plurality of seating assemblies 11. For example, the vehicle 10 can include a first front seating assembly 11, a second front seating assembly 11, and at least one rear seating assembly 11. Other seating arrangements are contemplated. In the present example, the accessory 16 enters the range of the accessory management circuit 44 (e.g., the identification circuitry 24) in FIG. 8A. In response to detection of the accessory 16, the control circuitry 28 can control the adjustment system 63 to move the front seating assemblies 11 to reveal the target area 66 or otherwise make accessible the docking station (FIG. 8B). In the present example, the adjustment system 63 moves the front seating assemblies 11 vehicle-rearward to an adjusted position in which the accessory 16 can be installed into the docking station, though other movements are contemplated. For example, the adjustment system 63 can pivot a seatback 100 of one or more of the seating assemblies 11 related to a seat base 102 to provide access to the docking station. The adjusted positions of the seating assemblies 11 can be set by the user or otherwise defaulted with approval by the user. The system 30 can alter the target movement based on occupancy conditions. By way of example, if an occupant were detected by the sensing circuit 46 in the rear seating assembly 11, a distance or other movement can be limited from encroaching on the occupant's space. In this way, the management system 30 can account for user preferences of the user approaching the vehicle 10 with the accessory 16 as well as the preferences of occupants in the vehicle 10. As shown in FIG. 8C, following docking of the accessory 16 in the docking station, the seating assemblies 11 can automatically move to a target position. The target position can correspond to a position for an identified occupant or any position pre-set by the user. For example, identity-specific positions can be effectuated following installation of the accessory 16.

Figure 9:
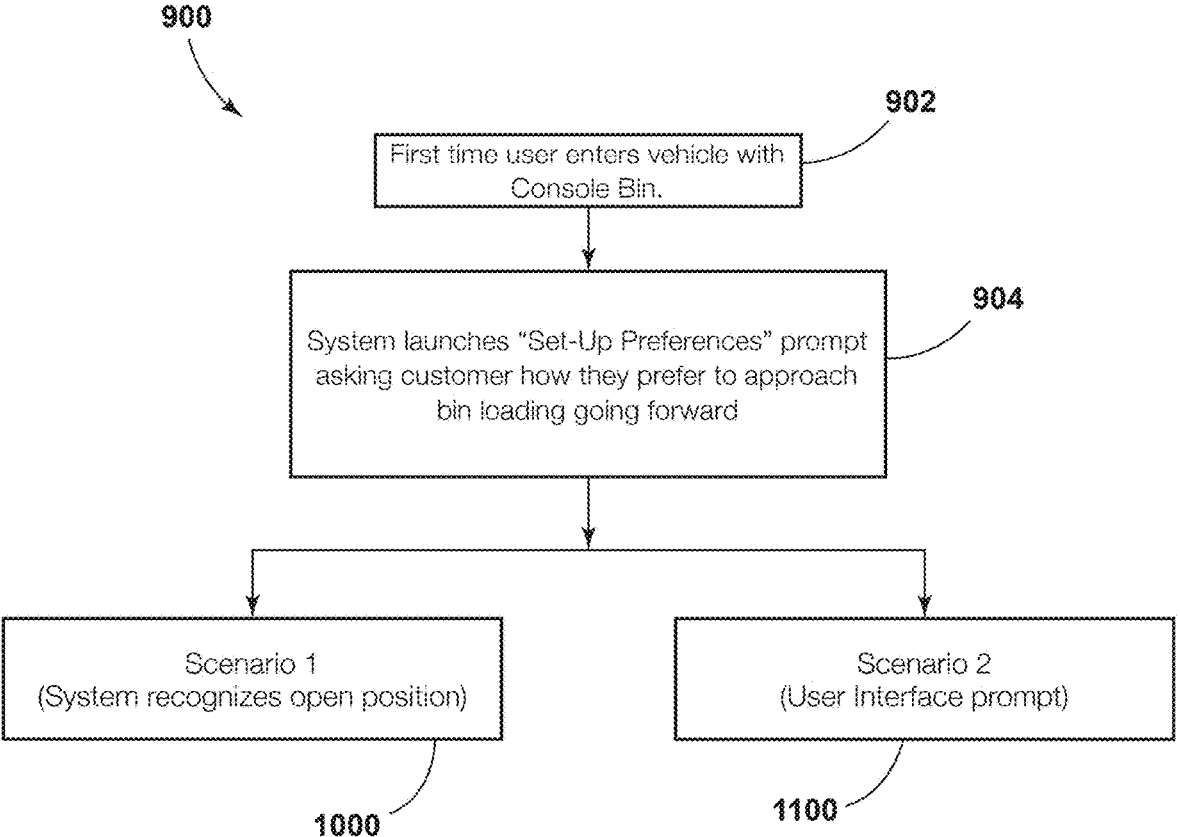
FIG. 9 is a flow diagram of an initialization method for setting response preferences for an accessory management system.

Referring now to FIG. 9, an initialization method 900, or process, carried out by the management system 30 can include detecting, via the identification circuit 24, an accessory 16 for the first time at step 902. The "first time" may be a subsequent detection following a reset of memory or a first use of a first detection of the accessory 16. Upon detection of the accessory 16, the control circuitry 28 can communicate a signal to the UI 86 to launch a preferences prompt at step 904. The preferences prompt can display options for the user to select for how the responses by the system 30 (e.g., how the adjustment system 63, lighting, and/or UI 86 will operate following detection of the accessory 16). It is contemplated that the user may set different settings depending on the type of accessory 16, such that each individual registered accessory 16 can have its own response settings when detected. In general, the UI 86 is configured to present options, such as an automatic mode 1000 and a manual mode 1100. Within each mode 1000, 1100, the user can select adjustment positions for the seating assemblies 11, occupancy limitations (e.g., when an occupant is in the rear of the vehicle 10, the adjustments not being automatic), lighting responses, and the like. In general, the automatic mode 1000 is configured to move one or more of the seating assemblies 11 without user interaction with the UI 86 when an approaching accessory 16 is detected, while the manual mode can utilize user interaction with the UI 86 for confirmation to move one or more of the seating assemblies 11.

Figure 10:
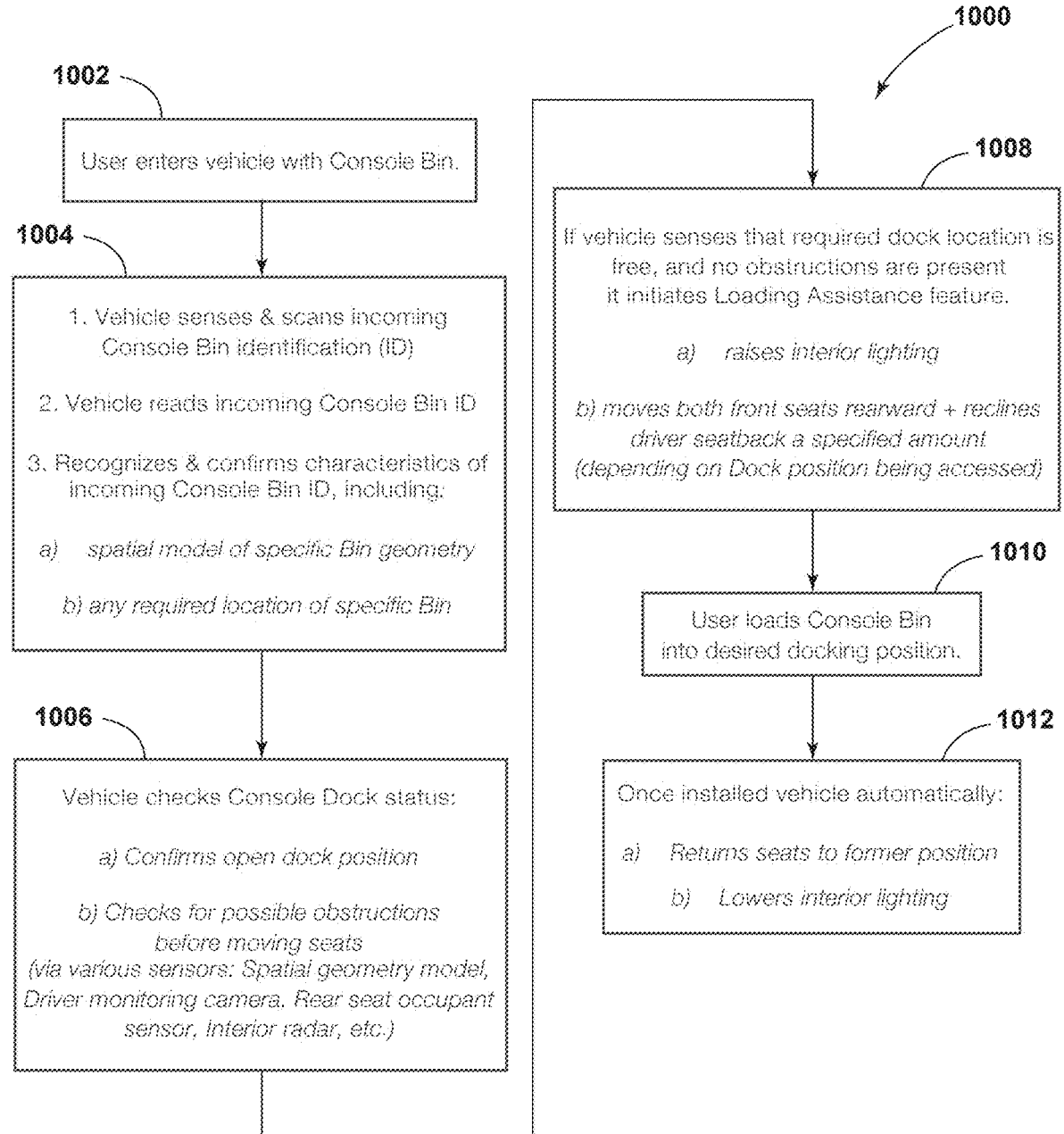
FIG. 10 is a flow diagram of a method for controlling adjustable components of a vehicle in response to detection of an accessory approaching the vehicle.

Referring now to FIG. 10, the automatic mode 1000 can include a method 1000, or process, carried out by the management system 30. At step 1002, the user approaches the vehicle 10 with the accessory 16 which is detected at step 1004. Also at step 1004, the identification circuit reads the identification (e.g., the identifier 18) of the accessory 16 and determines compatibility of the accessory 16 with the docking station as previously described. Classification of the accessory 16 can include utilizing a look-up table based on an RFID signal of the identifier 18. For example, the control circuitry 28 can determine an identity of the accessory 16 based on the identifier 18. The identity can be used by the control circuitry 28 to determine a spatial property of the accessory 16 based on the identifier 18. For example, a size, a shape, dimensions, a volume, an area, or the like of the given accessory 16 can be stored in the memory 58 and accessed by the system 30 in response to detecting presence of the accessory 16.

The control circuitry 28 can also access target installation locations for the accessory 16 in the docking station. For example, the docking station can have multiple installation points, each with different connections. For example, some accessories 16 can utilize an HVAC connection, electrical connection, or the like (as previously described), while others may not. Further, the docking station can be configured to secure different types of the accessories 16 at different points on the docking station. Accordingly, the specific installation location for a given accessory 16 can be stored in memory 58 for individual accessories 16.

At step 1006, the system 30 checks for potential obstructions and an open position of the docking station. For example, items disposed adjacent to the interface 14 and/or obstructions for a target path of the seating assemblies 11 when accommodating the accessory 16 can be detected. As previously described, sensors can be provided to detect such blockages/obstacles. The presence and location of occupants can also be detected, as previously described, for the control circuitry 28 to determine accessibility of the docking station.

At step 1008, the management system 30 initiates load assistance in the form of a response to provide easier installation of the accessory 16. For example, the control circuitry 28 can control interior lighting to illuminate the target area 66 and/or control adjustment of one or more of the seating assemblies 11. The control circuitry 28 can be configured to communicate an instruction to adjust the interior lighting (e.g., the lights 62) to illuminate the docking station in response to detecting no obstruction of the docking station. The control circuitry 28 can further, or alternatively, be configured to control the adjustment system 63 to control an amount of movement of at least one of the seating assemblies 11 based on the identity of the accessory 16. The system 30 can also control, via the control circuitry 28, the adjustment system 63 to limit moving of one or more of the seating assemblies 11 in response to detection of the obstruction. It is contemplated that the adjustment of the seating assemblies 11 can be based on which door is opened and/or which door the accessory 16 is entering. While the present example moves both front seating assemblies 11 forward, the control circuitry 28 can control the front seating assemblies 11 to move forward in response to detection of the rear door of the vehicle 10. Thus, occupancy, obstructions, and/or entry points can be used by the system 30 to determine the response to enhance access for installation of the accessory 16. For example, the control circuitry 28 can be configured to limit the adjustment system 63 from moving one or more of the seating assemblies 11 in response to an occupant positioned vehicle-rearward of a seating assembly 11.

Steps 1006 and 1008 can combinedly be employed by the control circuitry 28 to determine a spatial property of the accessory 16 based on the identifier 18, compare the spatial property to the obstruction, and control the adjustment system 63 further in response to the comparison of the spatial property to the obstruction.

At step 1010, the user loads the accessory 16 into the docking station. The loading can be detected by, for example, the sensing circuit 46 as previously described. In response to loading of the accessory 16, the system 30 can control the seating assemblies 11 to a target position (e.g., target seating positions for occupants) via control of the adjustment system 63 at step 1012. The target positions can be different than initial position of the seating assemblies 11, such that they may correspond to likely seating positions for the users approaching/entering the vehicle 10. For example, the target positions can be associated with identities of the users. The lights 62 can also or alternatively be controlled to limit or reduce illumination of the target area 66 in response to installation of the accessory 16.

Figure 11:
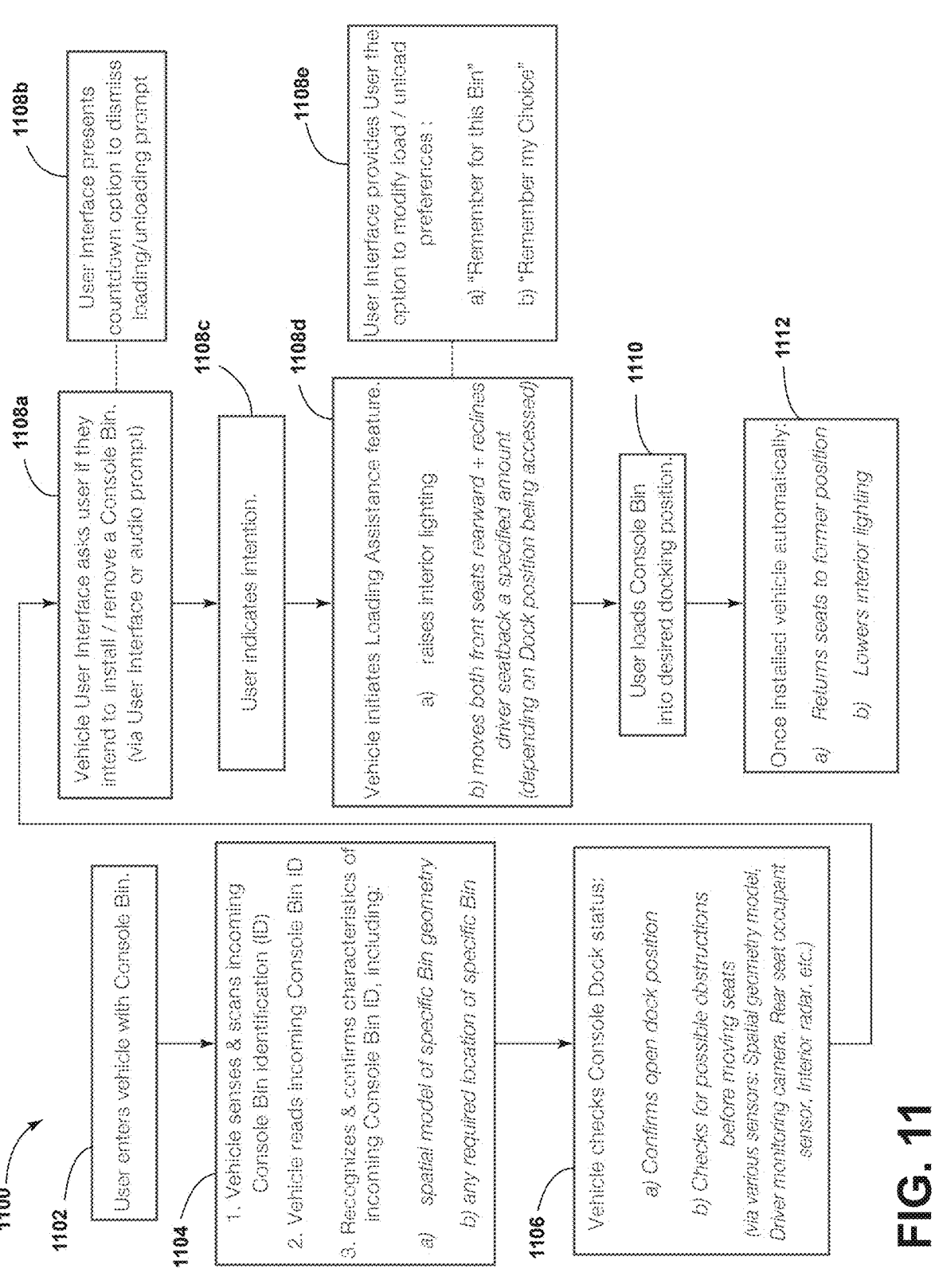
FIG. 11 is a flow diagram of a method for controlling adjustable components of a vehicle in response to detection of an accessory approaching the vehicle and user selections at a user interface.

Referring now to FIG. 11, the manual mode 1100 can include similar steps of steps 1002-1012, with steps 1102-1106 corresponding to steps 1002-1006, and steps 1110 and 1112 corresponding to steps 1010 and 1012, respectively. Step 1108 can differ from step 1008 according to steps 1108a, 1108b, 1108c, and 1108d. At step 1108a, UI 86 is configured to present a prompt to control one or more of the seating assemblies 11 in response to detection of the accessory 16 approaching the vehicle 10. The prompt may be audio and/or visual. At step 1108b, a default of automatically adjusting or maintaining positions of the seating assemblies 11 can be activated. The default setting can be entered by the user at the initialization process 900. The default mode is entered following a countdown, which can be presented at the UI 86 or not visible/audible. At 1108c, an option of the prompt can be selected by the user to indicate the intention to adjust the seating assemblies 11. If so, the manual mode 1100 moves to 1108d, which is substantially similar to step 1008. For example, the control circuitry 28 can be configured to control the adjustment system 63 further in response to a user response to the prompt.

In the manual mode 1100, a further step 1108e is provided to allow the user to store the response given by the user (e.g., to adjust the seating assemblies 11 and/or the lights 62). The control circuitry 28 can store the preference for a given accessory 16 or for all accessories 16 for a given entry point. At step 1110, the user loads the accessory 16, which is detected via the methods previously described, such as those in reference to step 1010. Step 1112 is substantially the same as step 1012.

In general, the present management system 30 may provide for a dynamic operation among a plurality of different accessories 16 that may be operable with a common interface 14 of the center console 12. Further, the present management system 30 may provide for anti-spoofing measures and enhanced operation of the accessory 16 when installed with the center console 12.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an endpoint of a range, the disclosure should be understood to include the specific value or end-point referred to. Whether or not a numerical value or endpoint of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

It is to be understood that variations and modifications can be made to the aforementioned structure without departing from the concepts of the present disclosure, and further, it is to be understood that such concepts are intended to be covered by the following claims unless these claims by their language expressly state otherwise.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vehicle, comprising:
a seating assembly;
a docking station adjacent to the seating assembly;
an accessory configured to selectively engage the docking station to couple the accessory with the vehicle;
an identification circuit configured to detect the accessory approaching the vehicle;
an adjustment system configured to adjust the seating assembly;

control circuitry in communication with the identification circuit and the adjustment system, the control circuitry configured to control the adjustment system to adjust the seating assembly to provide access to the docking station in response to detection of the accessory approaching the vehicle.

2. The vehicle of claim 1, wherein the accessory includes an identifier and the identification circuit is further configured to:

determine an identity of the accessory based on the identifier;

control the adjustment system to control an amount of movement of the seating assembly based on the identity of the accessory.

3. The vehicle of claim 1, further comprising:

a sensor configured to detect an obstruction for the docking station, wherein the control circuitry is configured to limit the adjustment system from moving the seating assembly in response to detection of the obstruction.

4. The vehicle of claim 3, further comprising:

interior lighting of the vehicle, wherein the control circuitry is configured to communicate an instruction to adjust the interior lighting to illuminate the docking station in response detecting no obstruction of the docking station.

5. The vehicle of claim 4, wherein the control circuitry is configured to control the interior lighting to reduce illumination of the docking station in response to positioning of the accessory in the docking station.

6. The vehicle of claim 3, wherein the accessory includes an identifier, and the control circuitry is further configured to:

determine a spatial property of the accessory based on the identifier, wherein the docking station is configured to secure different accessories having a plurality of sizes;

compare the spatial property to the obstruction; and control the adjustment system further in response to the comparison of the spatial property to the obstruction.

7. The vehicle of claim 1, wherein the adjustment system includes:

a first adjuster configured to adjust the seating assembly in a vehicle forward-rearward orientation; and a second adjuster configured to pivot a seatback of the seating assembly relative to a seat base of the seating assembly, wherein the control circuitry is configured to control the first adjuster and the second adjuster in response to presence of the accessory.

8. The vehicle of claim 1, further comprising:

a sensor that configured to detect a stowed position of the accessory in the docking station, wherein the control circuitry is configured to control the adjustment system to adjust the seating assembly from an adjusted position to a target position different than the adjusted position in response to detection of the stowed position.

9. The vehicle of claim 1, further comprising:

a sensor configured to detect occupancy of the vehicle, wherein the control circuitry is configured to limit the adjustment system from moving the seating assembly in response to an occupant positioned vehicle-rearward of the seating assembly.

10. The vehicle of claim 1, further comprising:

a user interface configured to present a prompt to control the seating assembly in response to detection of the accessory approaching the vehicle, wherein the control circuitry is configured to control the adjustment system further in response to a user response to the prompt.

11. A method, comprising:

detecting, via an identification circuit, an accessory approaching a vehicle, the accessory being configured to selectively engage a docking station to couple the accessory with the vehicle;

adjusting, via an adjustment system, a seating assembly of the vehicle in response to detection of the accessory approaching the vehicle to provide access to the docking station.

12. The method of claim 11, wherein the accessory includes an identifier, and further comprising:

determining an identity of the accessory based on the identifier; and controlling an amount of movement of the seating assembly based on the identity of the accessory.

13. The method of claim 11, further comprising:

detecting, via a sensor, an obstruction for the docking station; and limiting moving of the seating assembly in response to detection of the obstruction.

14. The method of claim 13, further comprising:

communicating an instruction to adjust an interior lighting of the vehicle to illuminate the docking station in response detecting no obstruction of the docking station.

15. The method of claim 14, further comprising:

controlling, via control circuitry, the interior lighting to reduce illumination of the docking station in response to positioning of the accessory in the docking station.

16. The method of claim 13, further wherein the accessory includes an identifier, and comprising:

determining a spatial property of the accessory based on the identifier, wherein the docking station is configured to secure different accessories having a plurality of sizes;

comparing the spatial property to the obstruction; and controlling the adjustment system further in response to the comparison of the spatial property to the obstruction.

17. The method of claim 11, further comprising:

detecting a stowed position of the accessory in the docking station; and controlling the adjustment system to adjust the seating assembly from an adjusted position to a target position different than the adjusted position in response to detection of the stowed position.

18. The method of claim 11, further comprising:

limiting the adjustment system from moving the seating assembly in response to an occupant positioned vehicle-rearward of the seating assembly.

19. The method of claim 11, further comprising:

presenting, via a user interface, a prompt to control the seating assembly in response to detection of the accessory approaching the vehicle; and controlling the adjustment system further in response to a user response to the prompt.

20. A vehicle, comprising:

a seating assembly;

a docking station adjacent to the seating assembly;

an accessory configured to selectively engage the docking station to couple the accessory with the vehicle;

an identification circuit configured to detect the accessory approaching the vehicle via an identifier of the accessory;

an adjustment system configured to adjust the seating assembly;

control circuitry in communication with the identification circuit and the adjustment system, the control circuitry configured to:

determine a spatial property of the accessory based on the identifier, wherein the docking station is configured to secure different accessories having a plurality of sizes;

compare the spatial property to the obstruction; and control the adjustment system to adjust the seating assembly to provide access to the docking station in response to detection of the accessory approaching the vehicle and the comparison of the spatial property to the obstruction.

\* \* \* \* \*